Patented Nov. 10, 1936

2,060,404

UNITED STATES PATENT OFFICE 2,060,404

DECOLORIZATION OF RESINS

Charles A. Thomas and William H. Carmody, Dayton, Ohio, assignors, by mesne assignments, to Monsanto Petroleum Chemicals, Inc., Dayton, Ohio, a corporation of Delaware No Drawing. Application June 15, 1932, Serial No. 617,478

2 Claims. (Cl. 260—2)

This invention relates to a decolorized resin or resinous material and a method of producing same.

One of the principal objects of this invention is to produce a decolorized resin which is pale in color or substantially colorless, from a resin which is decidedly darker in color.

Another object of the invention is to provide a method for decolorizing a resin which is not materially decolorized by ordinary adsorbing agents.

Another object of the invention is to provide an effective and practical method for producing from petroleum hydrocarbons a resin which is substantially colorless.

Still another object of the invention is to provide a method for decolorizing a petroleum resin by treatment with activated clay in the presence of a non-aromatic solvent.

Other objects and advantages of the invention will be apparent from the following description and appended claims.

The resin of the present invention is preferably a hydrocarbon resin produced from unsaturated petroleum hydrocarbons by reaction in the presence of a metallic halide catalyst. Such resins and methods of producing them are described and claimed in the Patent 1,836,629 to Chas. Allen Thomas, dated December 15, 1931, and in the copending applications of Chas. A. Thomas, Serial No. 461,807, filed June 17, 1930; Chas. A. Thomas, Serial No. 518,132, filed February 25, 1931; Chas. A. Thomas, Serial No. 482,157, filed September 15, 1930; Chas. A. Thomas, Serial No. 494,692, filed November 10, 1930; Chas. A. Thomas, Serial No. 526,578, filed March 30, 1931; Chas. A. Thomas, Serial No. 528,706, filed April 8, 1931; Chas. A. Thomas and William H. Carmody, Serial No. 599,161, filed March 16, 1932.

In producing these resins a crude mixture of hydrocarbons such as is contained in cracked distillate, or certain fractions of cracked distillate, or various substantially pure petroleum hydrocarbons, or mixtures of these, as set forth in the above mentioned patent and co-pending applications, may be utilized as starting materials.

For example resins may be produced from the following starting materials, or mixtures of these: a mixture of unsaturated hydrocarbons having one double bond and unsaturated hydrocarbons having two double bonds, such as olefines and diolefines; a mixture of diolefines and substituted benzenes such as alkyl benzenes and vinyl benzenes; a mixture of olefines, diolefines and substituted benzenes; a mixture of cyclic diolefines and cyclic olefines; cyclic olefines and diolefines with open chain olefines and diolefines and/or substituted benzenes; terpenes or mixtures of terpenes; terpenes and substituted benzenes; cracked petroleum distillate; specific fractions of cracked petroleum distillate; mixtures of cracked petroleum distillate or specific fractions of cracked petroleum distillate, with various hydrocarbons of the classes named above.

The chosen starting materials, with or without a suitable diluent, such as gasoline or benzol, are reacted with a metallic halide catalyst such as anhydrous aluminum chloride, to produce a resinous reaction product. The reacted or polymerized mixture is neutralized, for example with an ammonia-alcohol mixture, to precipitate the catalyst. The neutralized and precipitated catalyst is substantially completely separated from the resinous reaction product, which may conveniently be separated in solution in a suitable hydrocarbon solvent, such as benzol. The resin is then freed from solvent and hardened. The hydrocarbon resin thus produced ranges from light amber to dark brown in color, depending on the starting materials used and other factors.

Various methods for decolorizing this resin have hitherto been tried, without practical success. For example, treatment with adsorbing materials such as charcoal, has been found to have no material effect on the color of the resin.

We have now discovered that when these colored petroleum resins are placed in solution in a solvent which is non-aromatic in character, for example a solvent of the paraffin series such as hexane, and treated with fuller's earth or certain activated bleaching clays, the treated resin solution, when removed from the clay as by filtration, is materially lighter in color. For example, a resin solution may be obtained in this manner which is substantially colorless. When the solvent is removed from such solution, as by distillation, the remaining hard resin is still very light in color or substantially colorless.

We have also found that the resin may be decolorized without use of a solvent. That is, resin and clay may be melted together with rapid stirring, at a temperature high enough to drive off water from the clay, for example at a temperature of the order of 210° C., for 5 to 10 minutes. The fused mixture is then dissolved in a suitable solvent or mixture of solvents, for example hydrocarbon solvents such as commercial "Varnolene", naphtha, hexane and the like. This may be done by allowing the fused mass to solidify and then pulverizing before addition of solvent; or by addition of solvent to the partly cooled mass. On removal of the clay, as by filtration, a light colored solution is obtained. On removal of the solvent, as by evaporation, a light colored or colorless resin is produced. After removal of the clay by filtration there may result a solution of resin in the solvent which has a dark fluorescent color. If to such a resin solution is added a small proportion (less than 2% by weight based on weight of the resin) of a neutralizing solution, and the mixture is stirred, an immediate lightening in color results. The neutralizing solution used in above proportion may conveniently be an alkaline solution such as a solution containing 60% by volume of 95% ethyl alcohol and 40% by volume of ammonium hydroxide containing 23% NH₃ by weight. Such neutralization after clay treatment appears to give a lighter final product. More than one filtration may also be desirable in certain instances, to insure a clear resin product.

When preferred, this decolorizing treatment may also be applied to the described petroleum resin at various stages in the production of the resin.

As an example of the carrying out of this invention, the following procedure is described.

The resin to be decolorized is first put into solution in the desired solvent, such as hexane or pentane. Any desired concentration of solution which is practical for operations such as mixing and filtering may be used. A resin solution containing approximately 10 grams resin to 100 cc. solvent has been found convenient for treatment.

The solvent used is found to be an important factor in effectiveness of the decolorizing treatment. When benzene, toluene and other aromatic solvents are used, treatment with activated clays has not as much decolorizing effect. When non-aromatic or paraffin solvents such as pentane, hexane, naphtha and the like, are used, and the solution treated with certain activated bleaching clays, the resin solution is very effectively decolorized. It is also found that decolorization is more effective in presence of lower boiling solvents, such as pentane, hexane, heptane, the octanes and commercial mixtures of these, such as naphthas.

A finely ground activated bleaching clay is then added to the resin solution, and agitated for a short period of time, such as 15 minutes. This operation may be effectively carried out at temperatures below the boiling points of the solvents used, or at room temperature. Treatment at higher temperatures in some cases produces less marked decolorization. It is found, however, that when higher temperatures are used during the clay treatment, less time of contact of clay with resin is required to produce the same bleaching effect. Thus decolorization at about 120° C. has been found effective within about 10 minutes, while temperatures of the order of 210° C. have been used to obtain good decolorizing effect within periods of about 5 minutes.

It is also found that by treating a soft resin with clay the resin is rendered resistant to the darkening effect of the prolonged heat treatment necessary to harden such a resin. That is, such a soft resin when subjected to the clay treatment may then be hardened without further darkening.

The proportions of clay used may be varied widely, amounts varying from 1 to 100% by weight of the resin treated, having been found effective. However, the decolorizing treatment has been found to be more effective with successive treatments with small amounts of clay, than with a single treatment with larger amounts. For such successive treatments it is preferable that fresh batches of clay be used for each treatment. When treated in small batches of the order of 500 cc. of resin solution, 40% by weight of clay, based on weight of the resin, has been found to be effective in decolorizing the resin. Certain imported "activated bleaching clays" as well as commercial fuller's earth, are found particularly effective for use according to this invention. These clays differ from fuller's earth in that they have been activated by a chemical process with acid, washed, neutralized, dried and ground. Two of these clays imported by the Harshaw Chemical Co. of Philadelphia, and sold under the designation "Activated Bleaching Clay H—1", and "Activated Bleaching Clay H—15" have been found very satisfactory for this purpose. These clays are found to give an acid reaction when tested in water suspension with litmus.

After the above described treatment with clay, for example, clay H—1, the resin solution is separated from the clay by any convenient means, as by filtering. The color-bearing constituents of the resin and any insoluble materials remain with the clay, and the filtered resin solution is usually substantially colorless. If the color of the solution has not been lightened to the desired extent, the clay treatment may be repeated, using preferably a fresh batch of clay. The decolorized resin solution is then freed from solvent as by distillation, leaving a hard colorless or very light straw colored resin. This resin is found to produce a clear varnish, and appears to be equivalent in properties to the original petroleum hydrocarbon resin before the clay treatment.

This decolorizing treatment may also be readily applied to the polymerized mass containing the resinous reaction product, at certain stages of the resin-making process. For example, the polymerized mass before, during or after neutralization, and before or after filtration or separation of the catalyst, may be decolorized with a suitable activated bleaching clay in the manner described above.

It is found moreover, that the clay treatment as outlined above may be used instead of the neutralizing step usually carried out in the production of the petroleum hydrocarbon resins described above. This neutralization step comprises addition of a neutralizing material, such as an ammonia-alcohol mixture, to the polymerized mass containing the resinous reaction product and the polymerizing agent, such as aluminum chloride. This process is somewhat expensive, due to the cost of the reagents used.

It is now found that this polymerized mixture, without neutralization, can be treated with clay in the manner above described; the clay, containing the color-bearing material and the polymerizing agent, may be removed as by filtration; and a hard resin can then be obtained from the resulting solution in the usual manner, as by heating or steam distillation. When the described clay treatment is carried out at a temperature above 50° C., for example at temperatures of the order of 140° C., it is found that the neutralizing effect obtained is equivalent to that obtained by the standard ammonia-alcohol neutralization. That is, at such temperatures, substantially complete neutralization is obtained. However, at temperatures below 50° C., little neutralizing effect of the clay treatment has been noted. The resin neutralized by this clay treatment appears to be identical in properties with the petroleum hydrocarbon resin obtained by the standard method including addition of a neutralizing material. The resin is, however, lighter in color, and in some cases the yield is better.

While the methods herein described and the products so produced constitute preferred embodiments of this invention, it is to be understood that the invention is not limited to these precise methods or precise products, and that changes may be made therein without departing from the scope of the invention which is defined in the appended claims.

What is claimed is:

1. In the production of an unsaturated hydrocarbon resin from a cracked petroleum distillate, rich in diolefines and substantially free from impurities, by polymerization in the presence of a metallic halide catalyst after which the catalyst is separated from the polymerized hydrocarbon, the steps which comprise dissolving the resinous polymerization product in a non-aromatic hydrocarbon solvent, adding a bleaching clay to the resulting solution, agitating the mixture to bring about adsorption of the coloring materials by the clay, separating the clay and the adsorbed coloring materials from the resinous solution and removing the solvent from such resinous solution to produce a substantially colorless hard resin, the varnish making characteristics of which are substantially the same as those of the original resinous polymerization product.

2. In the production of an unsaturated hydrocarbon resin from a cracked petroleum distillate, rich in diolefines and substantially free from impurities, by polymerization in the presence of a metallic halide catalyst after which the catalyst is separated from the polymerized hydrocarbon, the steps which comprise dissolving the resinous polymerization product in a non-aromatic hydrocarbon solvent, adding a bleaching clay to the resulting solution, agitating the mixture for a period of time not substantially in excess of 15 minutes to bring about adsorption of the coloring materials by the clay, separating the clay and the adsorbed coloring materials from the resinous solution and removing the solvent from such resinous solution to produce a substantially colorless hard resin, the varnish making characteristics of which are substantially the same as those of the original resinous polymerization product.

CHARLES A. THOMAS.
WILLIAM H. CARMODY.